Feb. 18, 1969          H. A. ADAMS          3,428,493
ELECTRICAL ENERGY STORAGE DEVICE COMPRISING
ALUMINUM-LITHIUM ELECTRODE AND MECHANICAL
SCREEN SURROUNDING THE ELECTRODE
Filed Jan. 3, 1966

INVENTOR
HARRY A. ADAMS

BY

ATTORNEYS

United States Patent Office 3,428,493
Patented Feb. 18, 1969

3,428,493
ELECTRICAL ENERGY STORAGE DEVICE COMPRISING ALUMINUM-LITHIUM ELECTRODE AND MECHANICAL SCREEN SURROUNDING THE ELECTRODE
Harry A. Adams, Bedford, Ohio, assignor to The Standard Oil Company, Cleveland, Ohio, a corporation of Ohio
Filed Jan. 3, 1966, Ser. No. 518,113
U.S. Cl. 136—100                                   5 Claims
Int. Cl. H01m 17/02, 43/06

ABSTRACT OF THE DISCLOSURE

An electrical energy storage device operable above the melting point of the electrolyte. The device includes a fused salt electrolyte, an aluminum-lithium electrode immersed in the electrolyte, and a screen contacting the electrode and surrounding the surface of the electrode exposed to the electrolyte, for controlling dendritic growth on the electrode.

---

During the advancement study for the development of a practical electrical energy storage device, comprising the aluminum-lithium electrode, it was found that protuberances or dendrites gradually develop on the aluminum-lithium negative electrodes during charge and discharge. Dendritic growth proceed outward from the face of the electrode in the course of the operation of the cell. It can, therefore, be observed that dendritic growth on one electrode tends to approach, or grow toward, the opposing electrode. Consequently, if the dendritic growth is allowed to continue to grow, the growth forms a bridge between electrodes, resulting in the short circuiting of the electrical energy storage device, of which the electrodes are a component part. Hence, the short circuiting is equivalent to complete failure of the device. It is, therefore, contemplated by the present invention, to control the dendritic growth so as to substantially eliminate the problems associated with it in an electrical energy storage device.

Accordingly, it is an object of the present invention to control or substantially eliminate dendritic growth in an electrical energy storage device.

Figure 1:
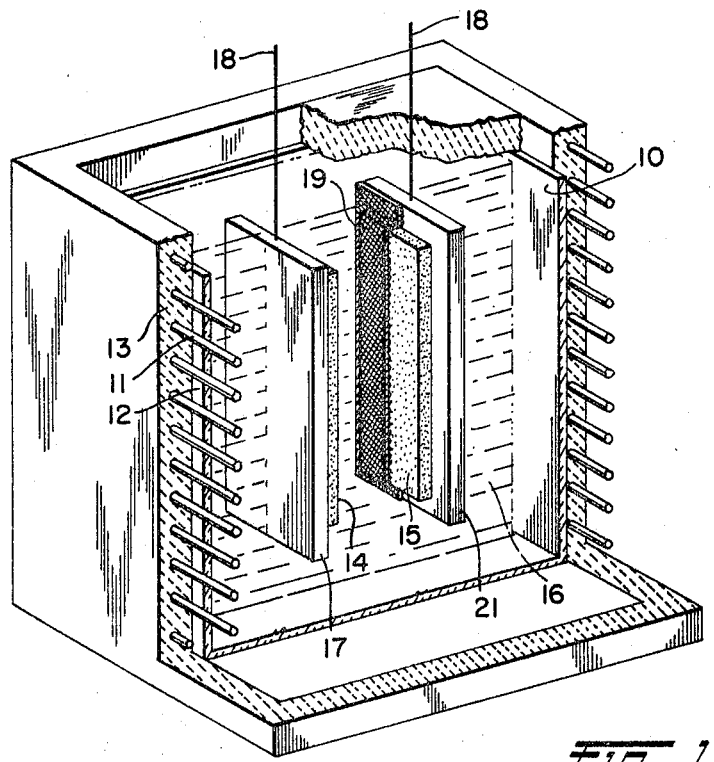
Figure 2:
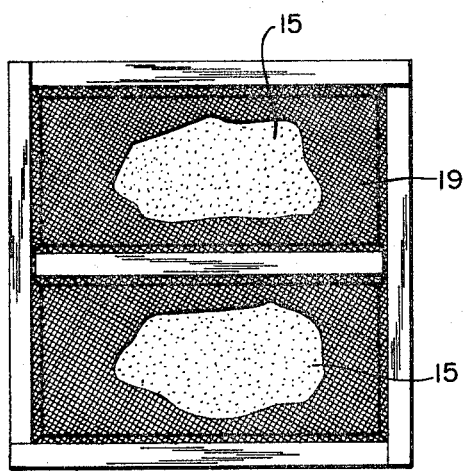

Referring more particularly to the drawing, FIG. 1 is a perspective view of an electrical energy storage device embodying the present invention, and FIG. 2 is a front and back view of the mechanical screen with the screen partially broken away to show the electrode.

According to the present invention, it has now been discovered that dendritic growth on an electrode of an electrical energy storage device can be effectively controlled by circumscribing or surrounding the electrode with a mechanical screen equivalent to about 100 mesh of 15 to 35 percent open area to about 20 mesh of 15 to 35 percent open area. Screens of higher than 100 mesh are mechanically weak, and screens of less than 20 mesh have openings too large to be effective in the practice of the invention. The electrode composition can be massive aluminum-lithium alloy, around which the screen is tightly secured, as by welding, or the electrode composition can be in the form of finely divided particles, deposited in a screen container and subsequently compacted. Electrodes so constructed have been unique in that there has been no dendritic growth beyond the screen even when the electrodes were cycled over 1,000 times in an electrical energy storage device. The mechanical screen offers the additional advantage of supplying additional structural strength to the electrode.

The screen can be of any composition, which is stable in the environment of the electrodes and the electrolyte, such as for example steel, so that it does not inhibit the electrical energy storage capacity of the cell and must be of sufficiently small mesh to contain the dendritic growth and the material of which the electrode is composed, but does not contribute significantly to any ionic resistance of the cell.

The electrode, circumscribed by the screen, is an aluminum-lithium alloy negative electrode and may be opposed by a positive electrode, of for example, a porous, activated carbon.

Activation of carbon is the process by means of which greatly improved adsorption properties and surface area are imparted to a naturally occurring carbonaceous material, e.g., charcoals of wood, coal and petroleum coke. Because electrical energy storage of the double layer electrical energy storage device is apparently based on surface area, an increase in energy storage can be expected from an increase in surface area, as by activation.

Active carbon has relatively high surface areas, usually greater than 400 sq. meters per gram. The surface area is mainly internal and may be generated by numerous activation methods some of which are hereafter discussed. In general, active carbon contains upward of 80 percent carbon as well as hydrogen, nitrogen, oxygen, sulfur and inorganic salts that leave an ash on combustion.

The initial stage in the preparation of an active carbon is carbonization or charring of the raw material, usually conducted in the absence of air below 600° C. Just about any carbon-containing substance can be charred. After the source material is charred, the second step is activation. The method used most extensively to increase the activity of carbonized material is controlled oxidation of a charge by suitable oxidizing gases at elevated temperatures. Most of the present commercial processes involve steam or carbon dioxide activation between 800° C. and 1,000° C. or air oxidation between 300° C. and 600° C. The time required for activation varies from 30 minutes to 24 hours, depending on the oxidizing conditions and the quality of active carbon desired. Alternate gases such as chlorine, sulfur dioxide and phosphorous may also be used in the activation step. It is also possible to mix inhibitors or accelerators with the carbon to develop the increased activity. Other activation methods include activation with metallic chlorides. Another general method of activation is the dolomite process. Substances such as dolomite, sulphates and phosphoric acid are mixed with the carbon. On activating, the material continuously releases a uniform distribution of oxidizing gases to the carbon surface. Other means of activation may be used.

The aluminum-lithium electrode can be produced by combining lithium with the aluminum by preparing a preformed alloy of aluminum and lithium, or, alternatively, electrochemically by charging a substantially pure aluminum electrode in an electrolyte containing lithium ions, to the extent of about one am-hr. per gram of aluminum, whereby lithium is diffused into the aluminum electrode structure.

The aluminum-lithium alloy of the electrode comprises aluminum in amounts of from about 70 to 98 weight percent, based on total composition, and from about 2–30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode, which functions best in a lithium halide electrolyte, is capable of storing the lithium metal without forming an extensive liquid. Hence, the electrode remains solid, which solid electrode is capable of diffusing the lithium metal through its structure. It has been found that on charge of the cell comprising the aluminum-lithium electrode, the electrode structure expands because lithium ions from the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The aluminum-lithium electrode material is preconditioned by slow charge and discharge initially. This slow preconditioning results in an electrode of substantially high uniform distribution of lithium in the aluminum and the concurrent development of added porosity, which resulting electrode facilitates the takeup and release of the lithium metal upon the subsequent fast charge and discharge of a cell containing the electrode. If the initial charge and discharge cycles of the preconditioning are carried out too rapidly, local regions of liquid metal alloy are built-up, and the result is pitting of the aluminum-lithium electrode, which pitting has a deleterious effect when the electrodes are put into routine use. Evidence of such pitting is visually apparent in the aluminum-lithium electrodes, indicating lithium agglomeration. Aluminum-lithium electrodes, cycled by slow charge and discharge, show a fine, even distribution of the lithium metal in the aluminum.

The electrolyte used in the device of this invention is a medium comprising a source of dissociated metal and halide ions which are mobile and free to move in the medium. Fused salt mixtures containing, for example, sodium chloride, calcium chloride, calcium fluoride, magnesium chloride, lithium chloride, potassium chloride, lithium bromide and potassium bromide can be used. These salts are particularly desirable from the standpoint of their low original cost. However, other economic factors, such as the operating temperature (size and cost of insulation for a reasonable heating cost), corrosiveness of the electrolyte or electro-decomposition products on the cell components and purification of the electrolyte must be considered. The lower melting point electrolytes are desirable. However, it is contemplated by the present invention that the electrolyte be operable at temperatures up to about 600° C.

Typical examples of materials which can be used as electrolytes include salts of metals. Specific examples of useful binary salt electrolytes are lithium chloride-potassium chloride, potassium chloride-magnesium chloride, magnesium chloride-sodium chloride, lithium bromide-potassium bromide, lithium fluoride-rubidium fluoride, magnesium chloride-rubidium chloride, lithium chloride-lithium fluoride, lithium chloride-strontium chloride, cesium chloride-sodium chloride, calcium chloride-lithium chloride, lithium sulfate-potassium chloride and mixture thereof.

Examples of ternary molten salt electrolytes are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems, when using an alumiunm-lithium negative electrode, are those of potassium chloride-lithium chloride and lithium bromide and potassium bromide and mixtures thereof.

A lithium chloride-potassium chloride system of 41 mole percent potassium chloride and 59 mole percent lithium chloride forms an eutectic which melts at 352° C. The potassium chloride-lithium chloride eutectic has a decomposition voltage of about 3.55 volts.

Before an electrical energy storage device comprising a carbon electrode can be fabricated for market, the carbon electrode is preconditioned, i.e., the oxygen or other easily degradable components in the carbon electrode structure must be removed and the carbon electrode must become permeated with electrolyte. Therefore, prior to commercial use of the electrical energy storage device, the carbon electrode is alternatively charged positively and negatively. The preconditioning for example invloves immersing the carbon electrode in an alkali metal halide ion-containing electrolyte and charging first to about 0 volt with respect to chlorine evolution and, subsequently, charging negatively to about −3.0 volts with respect to chlorine evolution using a potentiastatic sweep method. The cycling is continued for a number of times over a several-hour period.

Referring now more particularly to FIG. 1 of the drawing, there is shown a perspective view of an electrical energy storage device embodying an electrode of the present invention.

A container 10 provides a housing and serves as a storage reservoir for the electrolyte used in the system. Suitably, the container 10 is fabricated of a heat-resistant, noncorrosive material capable of withstanding the corrosive action of the electrolyte. This material must be an inert material, such as for example, a nonporous graphite, sheet steel, sheet nickel, stainless steel alloys or ceramics. Surrounding the device is a resistance heater, designated by the reference numeral 11. It is assumed that if the container is made of an electrically conducting material, the heater 11 is spaced from it by an insulator. Accordingly, a layer 12 of insulation material is placed over the outside surface of container 10 prior to application of the heater 11. Heater 11, as exemplified in the drawing, comprises a continuous nichrome wire in coil form, wound about the container 10, over the insulating layer 12, and thereby spaced from contact with the container 10. It is to be understood that the heater 11 can also be a flat strip type resistant unit as well as the coil wire mentioned. To conserve heat within the unit, there is conventionally and preferably provided an external insulation sheet 13 of suitable material, such as asbestos, rock wool or thoria. Other methods of applying heat to the cell are contemplated.

There is provided a pair of electrodes 14 and 15. Electrode 15 as shown in the drawing is an aluminum-lithium alloy electrode and electrode 14 is a carbon electrode. Surrounding electrode 15 is screen 19. In intimate contact with the electrodes 14 and 15 is electrolyte 16 and connected to the electrodes 14 and 15 are current collectors 17 and 21, respectively. The electrolyte 16 is composed of a material as aforedescribed. Current collector 17 is formed from graphite and the current collector 21 is formed of steel. Leads 18 are connected to and extend from the current collectors 17 and 21. These are adapted to be connected either to a charging circuit or to a load such as an electric motor, or the like, to impart power thereto.

To provide an assembled device, it is understood that the electrodes 14 and 15, respectively, can be connected with other electrodes of like charge by any suitable means, such as conducting bolts extending through the assembly.

Referring to FIG. 2 there is shown an enlarged front and back view of electrode 15 circumscribed by screen 19. The screen is a 70 mesh, 26 percent open area, steel screen.

In operation, positive carbon electrodes were fabricated from carbon plates of 400 sq. meters per gram surface area, a transverse strength of 1,600 p.s.i., resistance of 0.013 ohm/in.$^3$ and tensile strength of 700 pounds/in.$^2$. The electrodes are the requisite size for the cell being fabricated.

The carbon electrode was placed in a stainless steel box containing an 18 weight percent lithium-aluminum electrode around which there was a 70 mesh, 26 percent opening, steel screen, at which point preelectrolyzed lithium chloride-potassium chloride eutectic at a temperature above its melting point was poured into the cell and the cell sealed. The assembled cell is placed in an oven and slowly heated to a temperature of 475° C. under argon.

The electrolyte was made by blending together 44.8 weight percent lithium chloride and 55.2 weight percent potassium chloride and heating to a temperature of 550° C. while dehydrating by passing a mixture of argon and chlorine into the salt mixture for 4 hours. The eutectic was then preelectrolyzed to remove any remaining moisture and other impurities under an argon blanket, using a graphite rod as the positive electrode and an aluminum rod as the negative electrode.

The cell was preconditioned in the following way: 1.5 ampere constant current discharge to a cell potential of 0.5 volt; 1.5 ampere constant current charge to a cell potential of 3.55 volts; 1.5 ampere constant current discharge to a cell potential of 0.5 volt. From this point the cell was charged up at constant voltage to 3.35 volts. Cycling was then begun. Cycling comprised of a sixty-minute cycle, charging for a fixed period of time at constant voltage (3.35 volts), resting a short period to allow charge distribution and self-discharge, and subsequently discharging through a fixed load (1 ohm). The cell was cycled over 1,000 times. At the end of this time the aluminum-lithium electrode was examined for dendrites. It was visually observed that there was little or no dendritic growth on the electrode.

The screen also provides the advantages of holding the electrode composite material in place, thereby preventing the composite material from dropping off of the electrode.

Electric energy storage devices herein described lend themselves to connection with units of similar construction, either by connection of a number of units in series or in parallel or by utilization of stacks of electrodes.

The embodiments of the invention in which an exclusive property or privilege is claimed are defined as follows.

What is claimed is:

1. An electrical energy storage device operable above the melting point of the electrolyte, comprising in combination:
   (a) a container for holding electrolyte, said container being heat resistant and inert to the electrolyte;
   (b) a molten salt electrolyte disposed in the container and consisting essentially of alkali metal halide salts, alkaline earth metal halide salts, or mixtures of said salts;
   (c) means for heating the electrolyte to at, or above, its melting temperature;
   (d) a pair of spaced electrodes contacting the electrolyte, at least one of said electrodes consisting essentially of aluminum in the range of 70-98 weight percent and lithium in the range of 2-30 weight percent; and
   (e) a fluid pervious metallic screen, inert in the environment of the electrodes and electrolyte, disposed around at least that portion of the aluminum-lithium electrode contacting the electrolyte for controlling dendritic growth on said aluminum lithium electrode, said screen having a mesh size in range of 20-100 mesh with 15-35 percent open areas and circumscribing the electrode as distinguished from having electrode material disposed in openings of said screen.

2. The electrical energy storage device of claim 1, wherein the electrolyte is under inert atmosphere and consist essentially of lithium and potassium halide.

3. The electrical energy storage device of claim 1, wherein the electrolyte is under inert atmosphere and consists essentially of lithium chloride and potassium chloride, and the screen is composed of stainless steel.

4. The electrical energy storage device of claim 1, wherein the other of said pair of electrodes is a positive electrode composed of carbon.

5. The electrical energy storage device of claim 1, wherein the screen is composed of steel.

References Cited

UNITED STATES PATENTS

| | | | |
|---|---|---|---|
| 1,377,722 | 5/1921 | Marconi | 136—6 |
| 2,880,260 | 3/1959 | Strauss | 136—143 |
| 3,053,924 | 9/1962 | Strauss et al. | 136—30 |
| 3,207,630 | 9/1965 | Solomon et al. | 136—6 |
| 1,277,389 | 9/1918 | Cotte | 136—6 |
| 1,357,858 | 11/1920 | Fenwick | 136—6 XR |

JOHN H. MACK, *Primary Examiner.*

A. SKAPARS, *Assistant Examiner.*

U.S. Cl. X.R.

136—90, 120, 153